United States Patent
Huffer (10) Patent No.: US 11,535,440 B2
(45) Date of Patent: Dec. 27, 2022

(54) MAGNETIC RESEAL

(71) Applicant: SONOCO DEVELOPMENT, INC., Hartsville, SC (US)

(72) Inventor: Scott William Huffer, Hartsville, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 18 days.

(21) Appl. No.: 16/749,472

(22) Filed: Jan. 22, 2020

(65) Prior Publication Data

US 2021/0221591 A1 Jul. 22, 2021

(51) Int. Cl.
*B65D 75/58* (2006.01)
*B32B 27/08* (2006.01)
(Continued)

(52) U.S. Cl.
CPC .......... *B65D 75/5855* (2013.01); *B32B 27/08* (2013.01); *B65D 75/008* (2013.01);
(Continued)

(58) Field of Classification Search
CPC ........... B32B 3/04; B32B 27/08; B32B 27/32; B32B 37/14; B32B 2270/00;
(Continued)

(56) References Cited

U.S. PATENT DOCUMENTS 3,278,109 A * 10/1966 Salway .............. B65D 75/5855
383/41
4,738,390 A 4/1988 Brennan
(Continued)

FOREIGN PATENT DOCUMENTS

CN 205998313 U 3/2017
DE 202012006866 U1 10/2013
(Continued)

OTHER PUBLICATIONS

English machine translation of KR-20110008522-U obtained from PE2E (Year: 2011).*
(Continued)

*Primary Examiner* — James C Yager
*Assistant Examiner* — Thomas J Kessler
(74) *Attorney, Agent, or Firm* — Nelson Mullins Riley & Scarborough LLP (57) ABSTRACT

The invention is directed to a polymeric film web, a carrier film, and a magnetic member. The carrier film comprises an inner polyethylene terephthalate layer and an outer plastomer layer. The magnetic member and the carrier film are layered onto the polymeric film web to form a closure member. The outer plastomer layer is adjacent the magnetic member and the carrier film extends beyond an upper edge and/or a lower edge of the magnetic member. The closure is heat sealed such that the seal at the interface of the first carrier film and the second carrier film is a peelable seal, the seal at the interface of the first film web and the first carrier film is a permanent seal, and the seal at the interface of the second film web and the second carrier film is a permanent seal.

37 Claims, 10 Drawing Sheets

(51) Int. Cl.
  *B65D 75/00*   (2006.01)
  *B32B 3/04*    (2006.01)
  *B32B 27/32*   (2006.01)
  *B32B 37/14*   (2006.01)
  *B65D 33/28*   (2006.01)
  *B65B 61/18*   (2006.01)

(52) U.S. Cl.
  CPC .............. *B32B 3/04* (2013.01); *B32B 27/32* (2013.01); *B32B 37/14* (2013.01); *B32B 2270/00* (2013.01); *B32B 2307/31* (2013.01); *B32B 2439/70* (2013.01); *B65B 61/188* (2013.01); *B65D 33/28* (2013.01); *B65D 75/5805* (2013.01); *B65D 2313/04* (2013.01); *Y10T 428/13* (2015.01); *Y10T 428/139* (2015.01); *Y10T 428/1334* (2015.01); *Y10T 428/1352* (2015.01); *Y10T 428/1393* (2015.01)

(58) Field of Classification Search
  CPC ............ B32B 2307/37; B32B 2439/70; B65D 75/008; B65D 75/5855; B65D 2313/04; B65D 33/28; B65D 75/5805; Y10T 428/13; Y10T 428/1334; Y10T 428/1352; Y10T 428/139; Y10T 428/1393; B65B 61/188
  See application file for complete search history.

(56) References Cited

U.S. PATENT DOCUMENTS

| | | |
|---|---|---|
| 5,505,305 A | 4/1996 | Scholz |
| 2009/0136163 A1 | 5/2009 | Kerr |
| 2009/0269450 A1* | 10/2009 | Zerfas ................. B65B 61/188 |
| | | 426/123 |
| 2012/0128273 A1 | 5/2012 | Lytle |
| 2013/0032503 A1 | 2/2013 | Nobile |
| 2013/0061431 A1 | 3/2013 | Naftali |
| 2015/0196955 A1 | 7/2015 | Naftalin |
| 2017/0275056 A1 | 9/2017 | Boudouris |
| 2018/0148225 A1* | 5/2018 | Vandamme .......... B65D 33/007 |
| 2019/0133281 A1 | 5/2019 | Munie |

FOREIGN PATENT DOCUMENTS

| | | | |
|---|---|---|---|
| EP | 1683736 A2 | | 7/2006 |
| KR | 20110008522 U | * | 9/2011 |
| KR | 20110008522 U | | 9/2011 |
| WO | 2018101683 A1 | | 6/2018 |

OTHER PUBLICATIONS

International Search Report and Written Opinion for International Application No. PCT/US2021/013079; dated May 11, 2021; 13 pages.

* cited by examiner

MAGNETIC RESEAL

BACKGROUND

The present disclosure relates in general to flexible packaging for products, and more particularly to flexible bags and pouches, such as stand-up pouches. The disclosure is especially concerned with polymeric flexible pouches with magnetic reclose features.

Flexible materials, such as polymers and flexible films, are often used to construct packages for products, such as bags and pouches. Such packages can be used to hold a variety of items such as snack food, trail mix, chips, nuts, fruit pieces, and other foods. In some cases, as in the snack food example, the type of product contained in the package is meant for consumption by the user one portion at a time. For example, the consumer may consume a portion of a snack mix and then wish to reclose the package in a manner which will preserve the freshness of the snack mix for later use.

Standard pouch reclosure features include press-to-close zippers. However, zippers have certain disadvantages. For example, pouches are typically made from extensible films such as polyethylene and polypropylene. A zipper applied to the pouch must be compatible with the pouch material. Due to the nature of these various polymers, the extensible polymers will stretch during application of the zipper to the pouch, creating differential forces. The pouch and/or the zipper may become deformed and/or inoperable due to the extension and differential forces.

Further, if a brittle or non-extensible closure feature is utilized, such as a brittle magnet, the magnetic material will often break during application to the pouch, due to the stretching, differential forces, and/or deformation of the extensible film. As the film web stretches, the magnets may break. The inventors have developed an inventive closure system utilizing a magnetic reclose which avoids these disadvantages and provides numerous advantages.

BRIEF SUMMARY

Embodiments of the invention described herein provide improved packages and methods for constructing packages that provide a magnetic reclose feature. In an embodiment, the inventive closure comprises a carrier film. In an embodiment, the carrier film is sealed to the pouch material and the closure feature. While the invention largely focuses on magnetic closures, it should be understood that in an embodiment, the carrier film may comprise the carrier for any closure feature, such as a magnetic material, a press-to-close zipper feature, or a sliding zipper feature.

The inventive carrier film comprises, in an embodiment, a heat-sealable polyethylene terephthalate (PET) backbone. The PET backbone is, in an embodiment, adhered to a coextruded plastomer. In some embodiments, the plastomer may comprise a polyolefin plastomer. In certain embodiments, the plastomer may comprise coextruded polyethylene (PE). In an embodiment, the carrier film of the invention is non-extensible or substantially non-extensible. In an embodiment, the carrier film can be permanently heat-sealed to the interior of a pouch and can create a heat-sealed peelable bond at the opening of the pouch. In an embodiment, the polymers selected as the backbone and coextruded plastomer are selected based upon their relative seal initiation temperatures.

In an aspect, the invention comprises a carrier film for a magnetic closure comprising: a first non-extensible inner layer; a second non-extensible inner layer, wherein an inner surface of the first inner layer is configured to form a peelable heat seal with an inner surface of the second inner layer; a first outer layer having an inner surface adhesively bonded to an outer surface of the first inner layer, wherein the first outer layer comprises a plastomer and wherein the outer surface of the first outer layer is configured to form a permanent heat seal with a first wall of a packaging structure; a second outer layer having an inner surface adhesively bonded to an outer surface of the second inner layer, wherein the second outer layer comprises a plastomer and wherein the outer surface of the first outer layer is configured to form a permanent heat seal with a second wall of the packaging structure; a first magnetic member disposed adjacent the outer surface of the first outer layer and configured to be sealed between the first wall of the packaging structure and the first outer layer; and a second magnetic member disposed adjacent the outer surface of the first outer layer and configured to be sealed between the second wall of the packaging structure and the second outer layer.

In another aspect, the invention comprises a packaging structure comprising: a polymeric film folded into a pouch structure such that the pouch comprises a first end, a folded second end opposite the first end, and two sealed side edges, wherein the first end comprises an opening into the package and wherein the pouch comprises an interior surface; a carrier film disposed adjacent the first end of the pouch, on the interior surface of the pouch, on opposite sides of the opening, wherein the carrier film comprises: an inner layer, wherein at least a first portion of the inner layer is peelably heat sealed to a second portion of the inner layer on the opposite side of the opening so as to seal the packaging structure closed; and an outer layer adhesively bonded to the inner layer, wherein the outer layer comprises a plastomer and is permanently sealed to the interior surface of the pouch; and a magnetic member disposed between the pouch and the outer layer of the carrier film.

In yet another aspect, the invention comprises a packaging structure comprising: a first polymeric film sheet and a second polymeric film sheet sealed together to form a package having a first end, a closed second end opposite the first end, and at least two sealed side edges, wherein the first end comprises an opening into the package and wherein the first polymeric film sheet and the second polymeric film sheet comprise an interior surface; a first carrier film strip disposed adjacent the first end of the package, on the interior surface of the first polymeric film sheet, wherein the first carrier film strip comprises: an inner layer; and an outer layer which comprises a plastomer, wherein the outer layer is permanently sealed to the interior surface of the first polymeric film sheet; a second carrier film strip disposed adjacent the first end of the package, on the interior surface of the second polymeric film sheet, wherein the second carrier film strip comprises: an inner layer peelably heat sealed to the inner layer of the first carrier film strip so as to seal the packaging structure closed; and an outer layer which comprises a plastomer, wherein the outer layer is permanently sealed to the interior surface of the second polymeric film sheet; a first magnetic member disposed between the first polymeric film sheet and the outer layer of the first carrier film strip; and a second magnetic member disposed between the second polymeric film sheet and the outer layer of the second carrier film strip.

In still another aspect, the invention comprises a method for forming a packaging structure comprising: providing a polymeric film web; providing a carrier film, wherein the carrier film comprises: an inner layer comprising polyethylene terephthalate; and an outer layer which comprises a plastomer; and providing a magnetic member; layering the magnetic member and the carrier film on the polymeric film web as follows to form a closure member: a first layer of the film web, a first magnetic member, a first carrier film, a second carrier film, a second magnetic member, and a second film web, wherein the carrier film is disposed such that the outer plastomer layer is adjacent the magnetic member and wherein the carrier film extends beyond at least one of an upper edge and a lower edge of the magnetic member; and heat sealing the closure member at a temperature that is higher than the seal initiation temperature of the polyethylene terephthalate layer such that the seal at the interface of the first carrier film and the second carrier film is a peelable seal, the seal at the interface of the first film web and the first carrier film is a permanent seal, and the seal at the interface of the second film web and the second carrier film is a permanent seal.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1A:
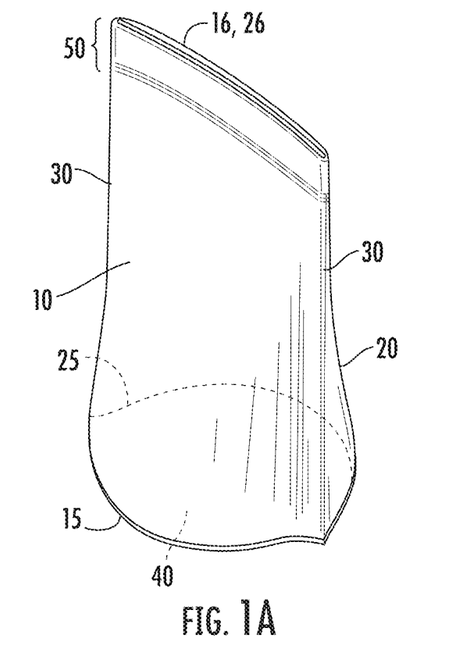
FIG. 1A is a perspective view of a package in an embodiment of the invention, the package being a stand-up pouch, where the package is in a closed configuration.
Figure 1B:
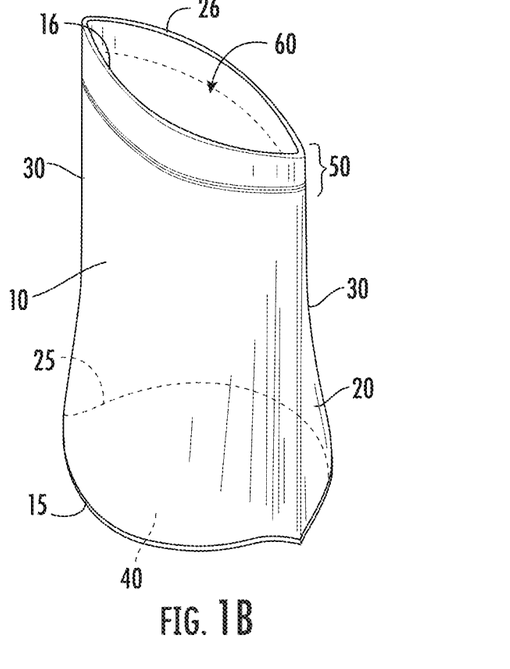
FIG. 1B is a perspective view of the package of FIG. 1A, where the package is in an open configuration.
Figure 2A:
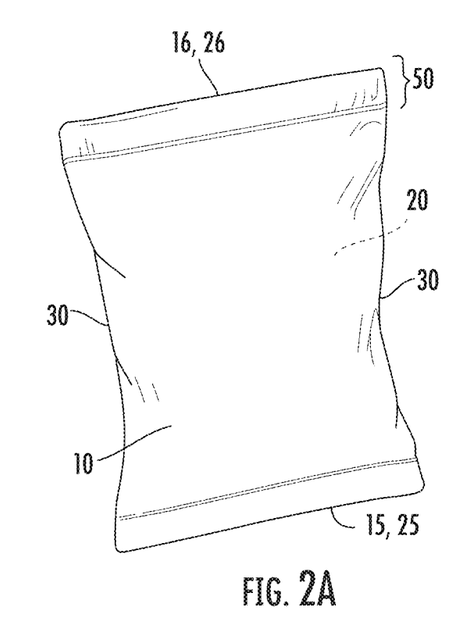
FIG. 2A is a perspective view of a package in an embodiment of the invention, the package being a bag, where the package is in a closed configuration.
Figure 2B:
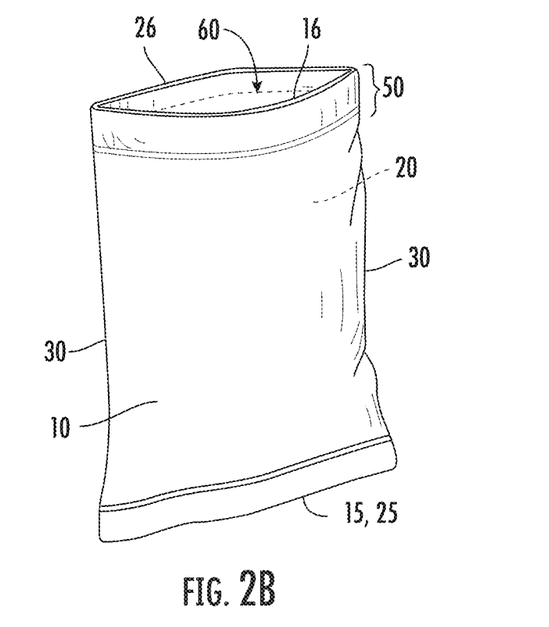
FIG. 2B is a perspective view of the package of FIG. 2A, where the package is in an open configuration.

The packages of the present invention may be made of flexible materials, such as various polymer-based materials. The packages may be used to hold food products, such as baking ingredients (e.g., sugar, flax seed, oatmeal, etc.), snack foods (e.g., trail mix, nuts, fruit pieces, chips, etc.), and/or other materials. Examples of such packages are illustrated in FIGS. 1A-3B. As depicted in the figures, such packages may, for example, have a front (or first) panel 10 defining an opening end 16, a base end 15, and two side edges and a back (or second) panel 20 defining an opening end 26, a base end 25, and two side edges. The front panel 10 and the back panel 20 may be joined to each other along respective side edges of the panels (e.g., via heat sealing) to create longitudinal seams 30. In some cases, the packages may be gusseted, as shown in FIGS. 1A and 1B, to form stand-up pouches. Thus, a base panel 40 may be connected to base ends 15, 25 of the respective front and back panels 10, 20 to form the base of the stand-up pouch. In other cases, the base ends 15, 25 may be joined to each other without the use of an additional base panel to form a bag, as shown in FIGS. 2A and 2B.

Figure 3A:
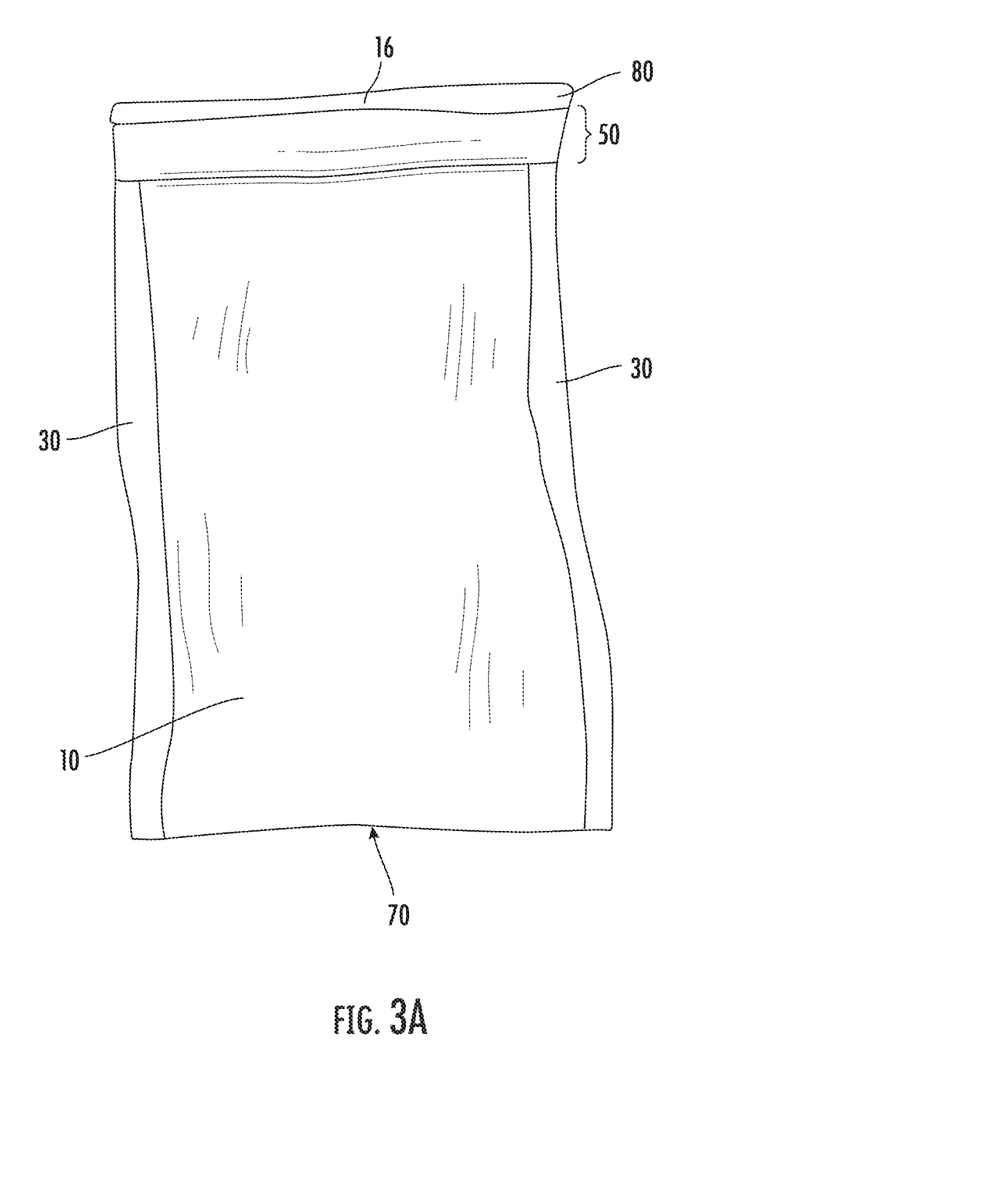
FIG. 3A is a perspective view of a package in an embodiment of the invention, the package being a folded pouch, where the package is in a closed configuration.
Figure 3B:
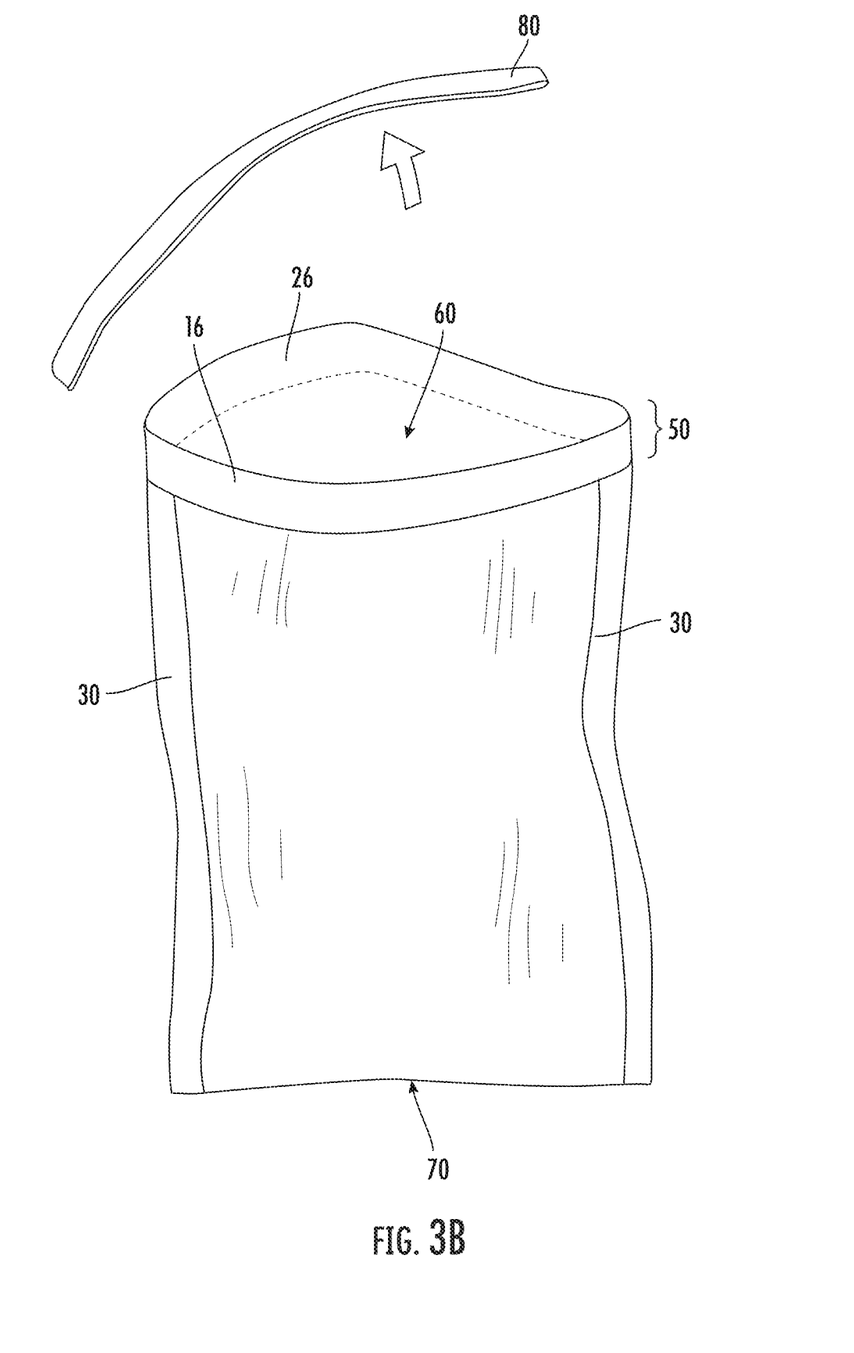
FIG. 3B is a perspective view of the package of FIG. 3A, where the package is in an open configuration.

In an embodiment, the package may not be sealed at the base ends 15, 25, but instead, the packaging structure may comprise a strip of material which is folded at the base end 70 to form a bottom of the package (shown in FIGS. 3A and 3B). In this embodiment, the film may be folded along a fold line 70 located centrally between the closure strip region 50 to form a C-fold or a V-fold configuration. The resulting two opposing portions of the film may be sealed together along their side edges 30 to form side seals. Optionally, the top end of the bag can also include a peelable heat seal or cold seal 80 located either outward or inward of the closure region 50, as depicted in FIG. 3A. In other embodiments, however, the packaging structure does not include a separate heat seal or cold seal 80 which must be removed/opened. Embodiments of the invention are applicable in, and may be embodied by, various kinds of packages including stand-up pouches, bags, or any other reclosable package that includes front and back panels joined at longitudinal seams.

In an embodiment, the opening end 16 of the front panel and the opening end 26 of the back panel define an opening 60 of the package that is configured to provide access to contents of the package when the package is opened by a user. A consumer may open the package by separating the front and back panels 10, 20, such as by peeling a heat seal, cold seal, or other seal above the reclose feature (in which case the reclose feature 50 may be disposed in an initially open position) or opening a closure feature in the reclose region 50. As noted, the reclose feature may be any known in the art such as a press-and-close zipper, interlocking male/female strips, a slide zipper, a tongue-and-groove mechanism, or a magnetic mechanism, or any other closure known in the art that is useful for allowing the joining and separation of the opening ends 16, 26 of the front and back panels together. In an embodiment, the reclose feature may be a linear reclose device.

Figure 4A:
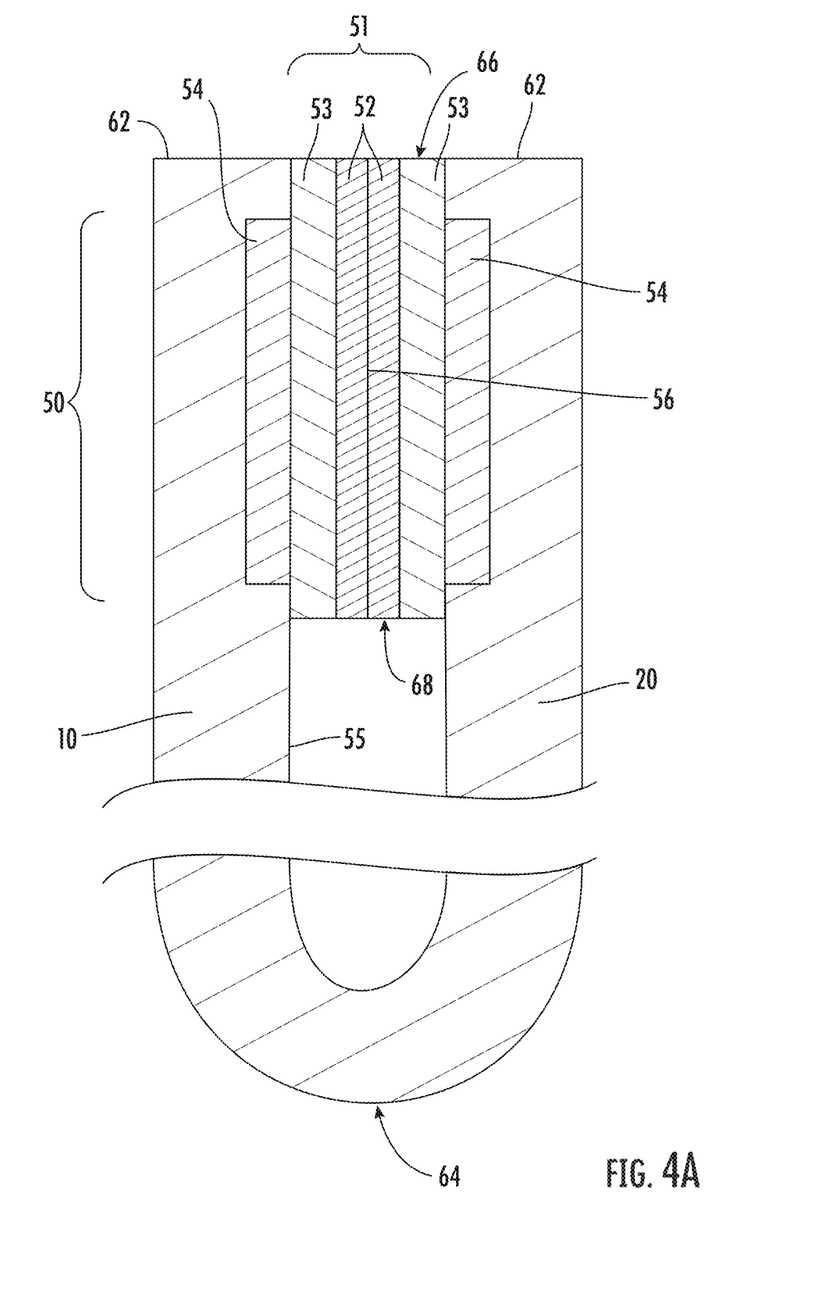
FIG. 4A is a cross-sectional view of a package and closure in an embodiment of the invention, wherein the package is in a closed configuration.
Figure 4B:
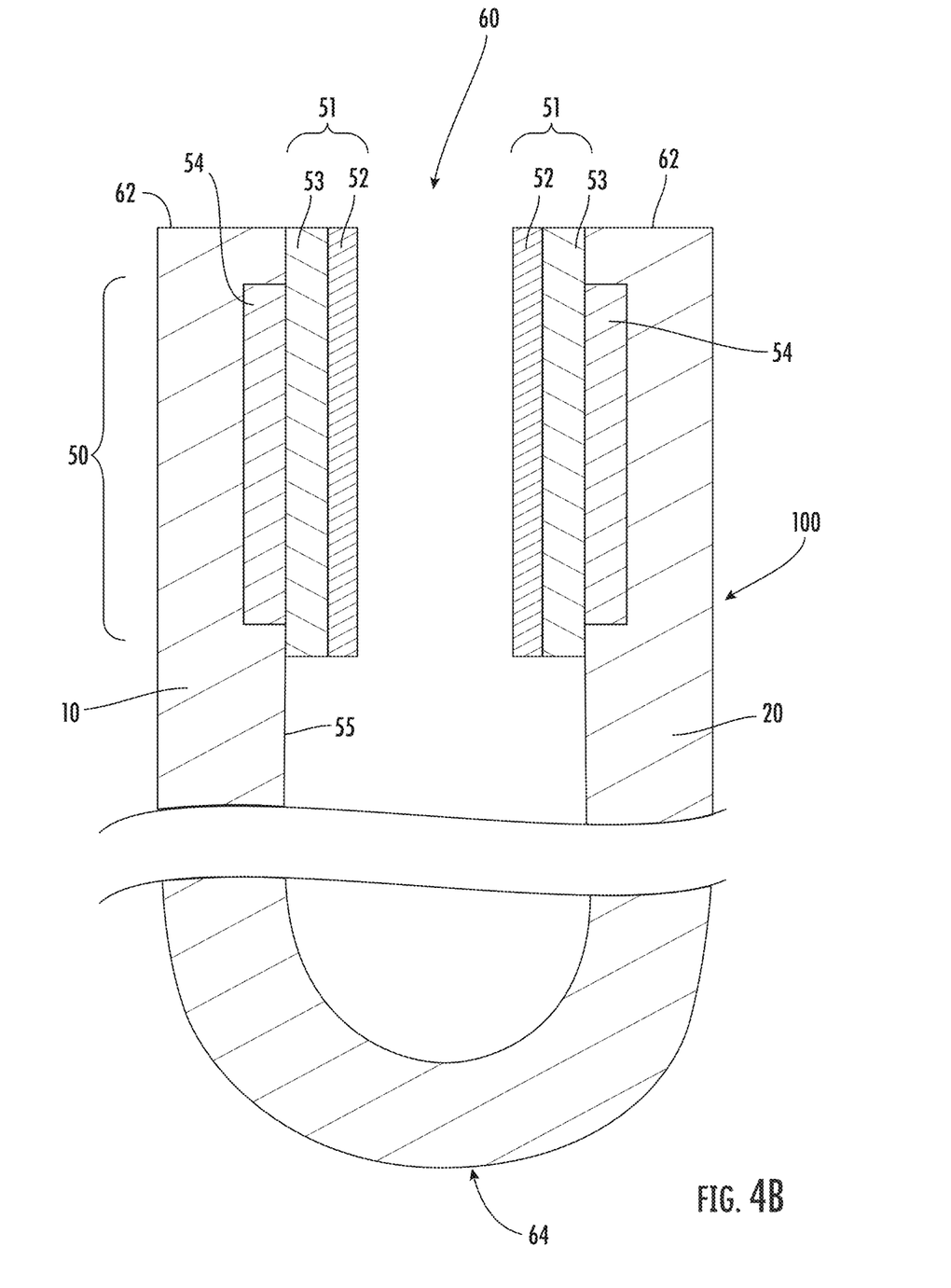
FIG. 4B is a cross-sectional view of a package and closure in an embodiment of the invention, wherein the package is in an open configuration.

As shown in the exploded cross-sectional side view of FIGS. 4A and 4B, the inventive packaging system may comprise a pouch 100, a magnetic material 54, and a carrier film 51. The carrier film 51 may comprise a plurality of layers. In an embodiment, the carrier film 51 comprises at least two layers. In an embodiment, the carrier film 51 may comprise an inner layer 52 and an outer layer 53, with respect to the interior of the packaging structure. In an embodiment, each of the inner layer 52 and the outer layer 53 may comprise a film. In an embodiment, the inner layer 52 (also referred to as the backbone) may provide stiffness and tensile strength to the carrier film 51. In an embodiment, the inner layer 52 may comprise a layer of heat-sealable polyethylene terephthalate (PET). In a particular embodiment, the inner layer may comprise heat sealable PET (HSPET).

The inner layer 52 of the carrier film 51 is, in an embodiment, adhered to an outer layer 53. In an embodiment, the outer layer 53 comprises a plastomer. In some embodiments, the outer layer 53 comprises a coextruded plastomer. In some embodiments, the plastomer may comprise a polyolefin plastomer. In certain embodiments, the plastomer may comprise coextruded polyethylene. In an embodiment, the outer layer 53 may comprise low density polyethylene (LDPE), linear low density polyethylene (LLDPE), polypropylene (PP), or oriented polypropylene (OPP). In an embodiment, the outer layer 53 is referred to as a skin layer. In an embodiment, the inner layer 52 and the outer layer 53 are laminated to each other. Any resin or adhesive known in the art may be utilized to adhere the inner layer 52 and the outer layer 53.

In an embodiment, the carrier film 51 is non-extensible or substantially non-extensible. In an embodiment, the inner layer 52 of the carrier film 51 is non-extensible or substantially non-extensible. In an embodiment, the carrier film 51 can be heat-sealed to the interior 55 of a packaging structure. The heat-seal to the interior 55 of the pouch 100 may comprise a permanent seal. In an embodiment, the carrier film 51 can be heat-sealed to another carrier film 51 on the opposite side of the pouch to create a peelable bond at the opening of the pouch. More particularly, the peelable bond may be disposed between the two inner layers 52 of the carrier film 51, at an interface 56. In an embodiment, the peelable bond comprises a PET/PET interface. In an embodiment, the peelable bond located at the interface 56 between the inner layers 52 of the carrier film 50 comprises a hermetic seal until such time as the package is opened. After the package is opened, the peelable seal located at the interface 56 between the inner layers 52 of the carrier film 50 becomes a resealable seal due to the magnetic reclosure features provided herein. Thus, in some embodiments, there is not a need for a peelable heat seal or cold seal 80 located either outward or inward of the closure region 50 (shown in FIG. 3) because the PET/PET interface 56 provides a peelable heat seal that is hermetic until the package is opened and then becomes a resealable seal.

In an embodiment, the bond between the outer layer 53 and the interior of the packaging structure 55, is a permanent bond. That is, in an embodiment, the outer layer 53 of the carrier film 51 cannot be separated from the interior of the packaging structure 55 without destruction of the packaging structure 55, the carrier film 50, or both. In an embodiment, the packaging structure (i.e. front panel 10, back panel 20, etc.), comprises polyethylene or polypropylene.

In an embodiment, the polymers selected as the backbone (inner layer 52) and coextruded plastomer (outer layer 53) are selected based upon their relative seal initiation temperatures. In this embodiment, the inner layer 52 may have a higher seal initiation temperature than that of the outer layer 53. In an embodiment, the temperature differential for the seal initiation between the inner layer 52 and the outer layer 53 may be between about 20 and 40 degrees. In an embodiment, the seal initiation temperature (and/or the seal activation temperature) of the inner layer 52 may be between about 215° and 225° F. In an embodiment, the inner layer 52 may be considered to have a high seal initiation temperature. In an embodiment, the seal initiation temperature (and/or the seal activation temperature) of the outer layer 53 may be between about 180° and 200° F. In an embodiment, the outer layer 53 may be considered to have a low seal initiation temperature.

In an embodiment, the carrier film 51 is provided in a strip form. That is, the carrier film 51 may extend along a width of the package, from side seal to side seam, without extending the length of the pouch (from top to bottom). In an embodiment, the carrier film 51 is not coextensive with the shape and size of the pouch or package, in at least one dimension. In an embodiment, the carrier film does extend into the side seams of the packaging structure.

In an embodiment, the magnetic members 54 may comprise extrudable magnetic particles, a printable hot melt magnet, or any other magnetic materials known in the art. For example, a printable hot melt magnet may be directly printed onto a substrate in a molten state without the use of any adhesive, or may alternatively be applied in a cooled state with the use of adhesive, or through a heat bonding method. Magnetizable compositions can be printed in a relatively thin coating at high speeds, and can be magnetically aligned, to maximize the magnetic holding force.

In an embodiment, the magnetic members 54 comprise magnetic particles or materials combined with a polymer material. For example, in an embodiment, the magnetic members 54 comprise about 70 wt-% to about 95 wt-% of the magnetizable particles and about 5 wt-% to about 30 wt-% of at least one polymer material. In some embodiments, the magnetic members 54 comprise about 80 wt-% to about 90 wt-% of the magnetizable particles and about 10 wt-% to about 20 wt-% of at least one polymer material. However, any percentage of magnetizable particles and polymer are contemplated herein.

The polymeric material, optionally referred to as a thermoplastic binder, may include any polymeric material that is readily processable with the magnetic particles. Such thermoplastic materials include both thermoplastic elastomers and non-elastomers or any mixture thereof. The polymer material and the magnetizable particles can be added to and melted in an extruder, in an embodiment. In another embodiment, the polymer and magnetizable particles may be provided in a premade form, such as a pellet. In an embodiment, the magnetic members 54 (polymer and magnetizable particles) are then extruded.

In an embodiment, the magnetic member 54 is coextruded with a resin, such as ethylene vinyl acetate (EVA). In an embodiment, the resin may comprise EVA copolymerized with other resins such as LDPE and LLDPE. In an embodiment, the resin may comprise a polyolefin-based hot melt adhesive such as an amorphous polyolefin or metallocene, or any other hot melt adhesive known in the art. In this embodiment, the resin may aid in bonding the magnetic member 54 to the pouch interior 55 and/or the carrier film 51.

The magnetic members 54 may each have at least one north pole and at least one south pole. In some instances, the magnetic members 54 may comprise multipole magnets, each magnetic member 54 having a plurality of poles per magnet. In other embodiments, the magnetic members 54 may each have a single north pole or a single south pole, respectively. The scope of the disclosure is not limited by the arrangement of the magnetic members 54 provided that magnetic members 54 are magnetically attracted to one another.

The magnetic particles used in the magnetic members 54 of the invention may comprise any magnetic particles known in the art. In an embodiment, ferrites, strontium, strontium ferrite, neodymium, and/or samarium cobalt may be used. In one embodiment, the magnetic particles comprise ferrites having the general formula ($M^{2+}O6Fe_2O_3$) $Mfe_{12}O_{19}$ where M represents Ba or Sr. Other examples of magnetic materials suitable for use herein include a rare earth-cobalt magnet of $RCO_5$ where R is one or more of the rare earth elements such as Sm or Pr, yttrium (Y), lanthanum (La), or cerium (Ce). Other specific examples of magnetic materials include, for instance, manganese-bismuth, and manganese-aluminum.

In an embodiment, the magnetic members 54 are provided in strip form. That is, the magnetic members 54 may extend from one side seam to the other side seam of the package (width), but may not extend the length of the packaging structure, from top to bottom. The magnetic members 54 may, in an embodiment, extend into the side seals 30 of the packaging structure. In other embodiments, the magnetic members 54 may be disposed interior of the side seals 30 of the packaging structure.

In an embodiment, the carrier film 51 has a greater longitudinal dimension (between the top and bottom of the packaging structure) than that of the magnetic members 54. That is, the carrier film 51, in an embodiment, extends above and/or below the magnetic members 54, in the longitudinal direction of the packaging structure. This allows the outer layer of the carrier film 51 to be adhered directly to the packaging inner surface, adjacent to and/or around the edges of the magnetic member. In an embodiment, the carrier film 51 and the magnetic members 54 are each in strip form, and the carrier film strip 51 is wider than the magnetic member strip. In an embodiment, the magnetic members 54 have an upper edge and a lower edge and the carrier film 51 extends beyond one or both of the upper edge and/or lower edge of the magnetic members 54. In an embodiment, the carrier film 51 surrounds or partially envelops the magnetic member 54. In an embodiment, the carrier film 51 is sealed to the pouch inner surface above an upper edge of the magnetic member 54, below a lower edge of the magnetic member 54, or both.

In an embodiment, the inventive pouch or bag may be formed from polyolefins and copolymers or terpolymers thereof, for example, polypropylene (PP), polyethylene (PE), high density polyethylene (HDPE), medium density polyethylene (HDPE), LDPE and LLDPE, polyesters and copolymers thereof, for example, polyethylene terephthalate (PET), and so forth. In some embodiments, the pouch may comprise a barrier material. In other embodiments, the pouch or bag itself may comprise a metalized or foil laminated polypropylene, for example, aluminum laminated polypropylene. Additionally, in other embodiments, the pouch or bag of the invention may be formed from or comprise a layer of paper, paper products or pasteboard, for example, paperboard or cardboard, and laminated versions thereof.

Embodiments of a method of manufacturing a package as described above are also provided herein. In a first step, the outer layer 53 of the carrier film 51 may be formed. In an embodiment, the outer layer 53 is coextruded with a resin that is compatible with and allows it to bond to the inner layer 52 of the carrier film 51. In an alternative embodiment, the outer layer 53 is coextruded with a resin that is compatible with and allows it to bond to the inner surface 55 of the pouch 100.

In either embodiment, the outer layer 53 is coextruded or otherwise provided and aligned with a web of the inner layer 52. An adhesive may optionally be applied to one or both of the inner layer 52 and/or the outer layer 53. The outer layer 53 and the inner layer 52 may then be laminated together, using nip rollers or any other method known in the art, with the adhesive or resin being disposed between them. After lamination, the carrier film may be cut into strips, if desired.

In an embodiment, the magnetic members 54 are formed through extrusion techniques. In this embodiment, a polymeric resin may be heated to a molten or flowable temperature and mixed with magnetic particles in an extruder. The extrudate may be extruded in a sheet or strip form. A magnetizer, such as a rare earth magnet, can be used to magnetize the magnetic particles optionally as the extrudate cools. For example, a chill roll that is wrapped in magnets, such as neodymium magnets, could be employed. In an embodiment, the magnetic members 54 are then cut into strips of a size that is slightly smaller than the carrier film 51 strips.

The pouch material may also be provided in web form. In one embodiment, the magnetic members 54 may be applied by extrusion to the pouch material. Alternatively, however, the magnetic members 54 are provided in strip form and are applied to the pouch material as such. On the opposite side of the magnetic members 54, the carrier film 51 may be applied such that the outer layer 53 of the carrier film 51 is disposed adjacent the magnetic member 54.

Figure 5:
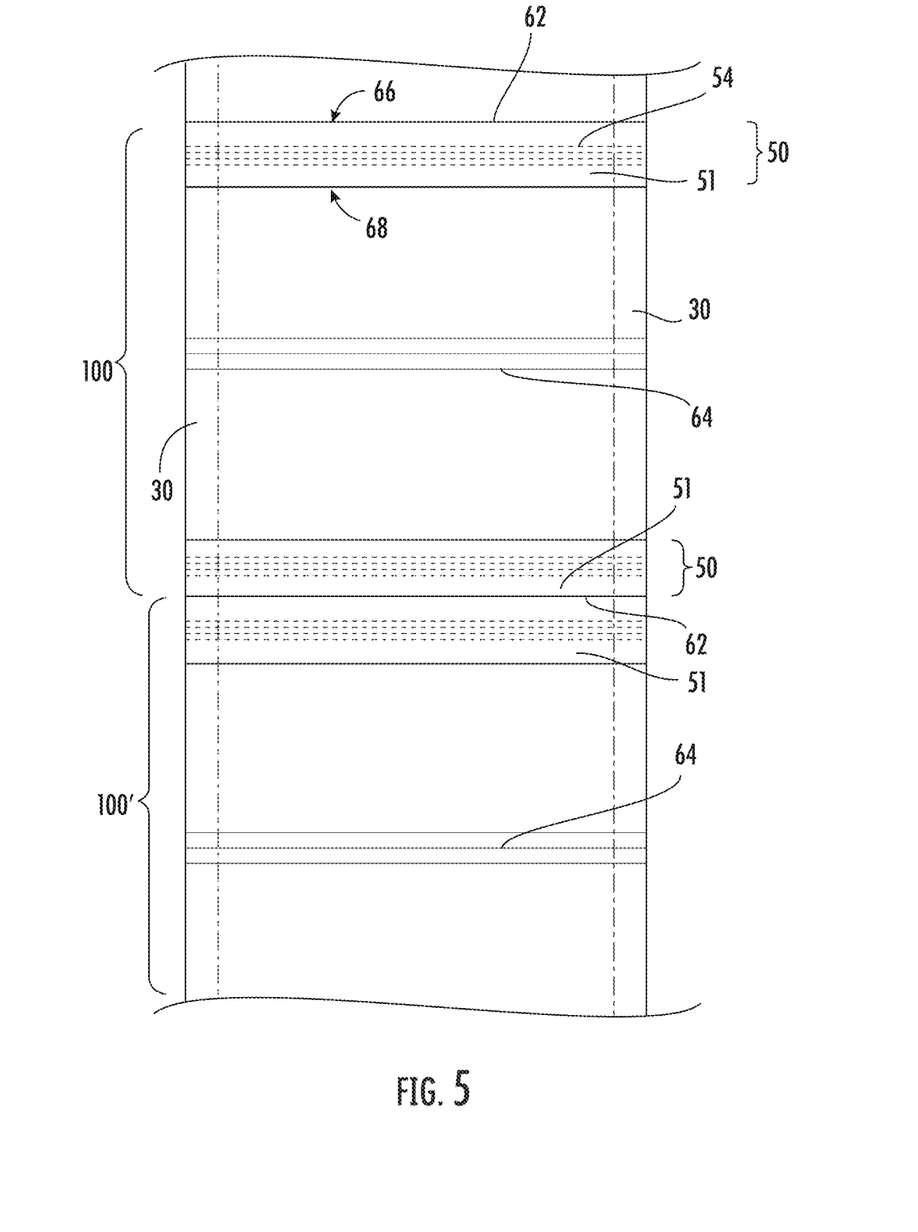
FIG. 5 is a top view of a web formation of the package of the present invention, in an embodiment.
Figure 6:
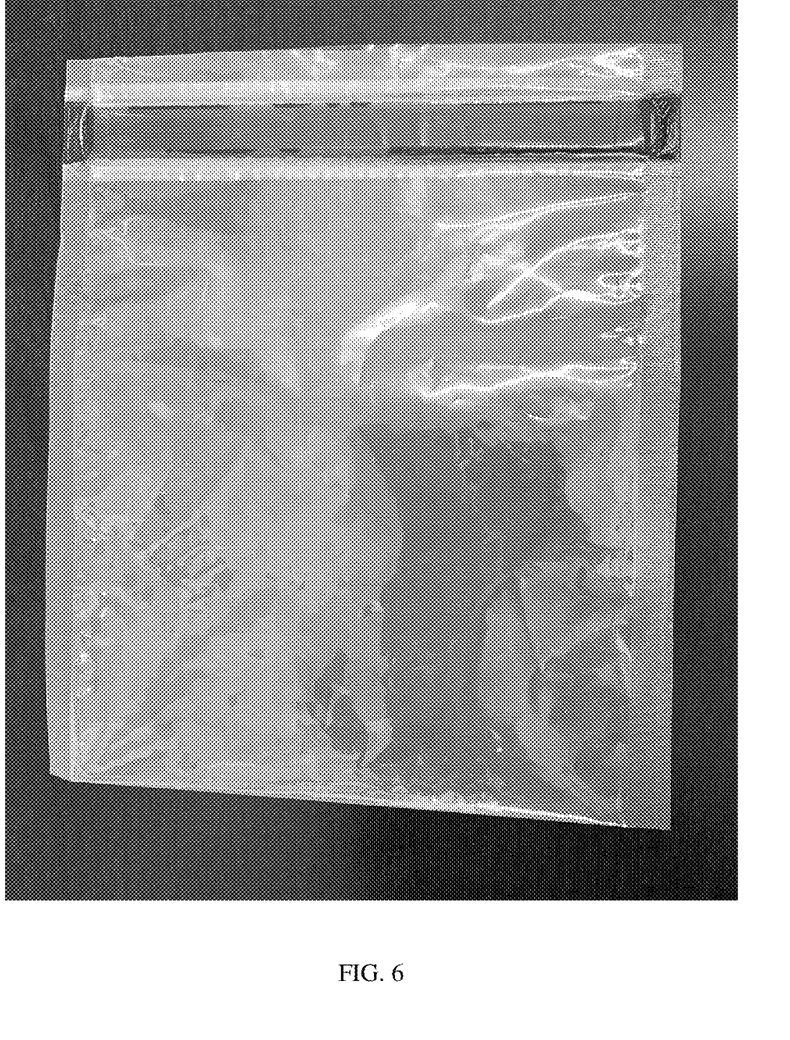
FIG. 6 is a photograph of a front view of a package, in an embodiment of the invention.
Figure 7:
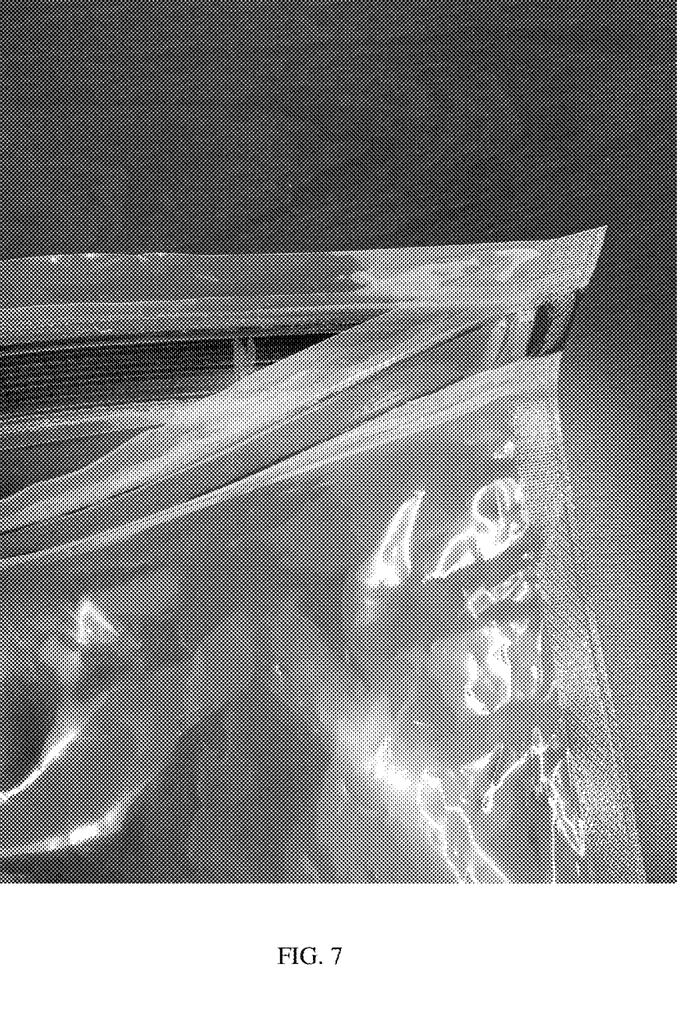
FIG. 7 is a photograph of a package in an open configuration, in an embodiment of the invention.
Figure 8:
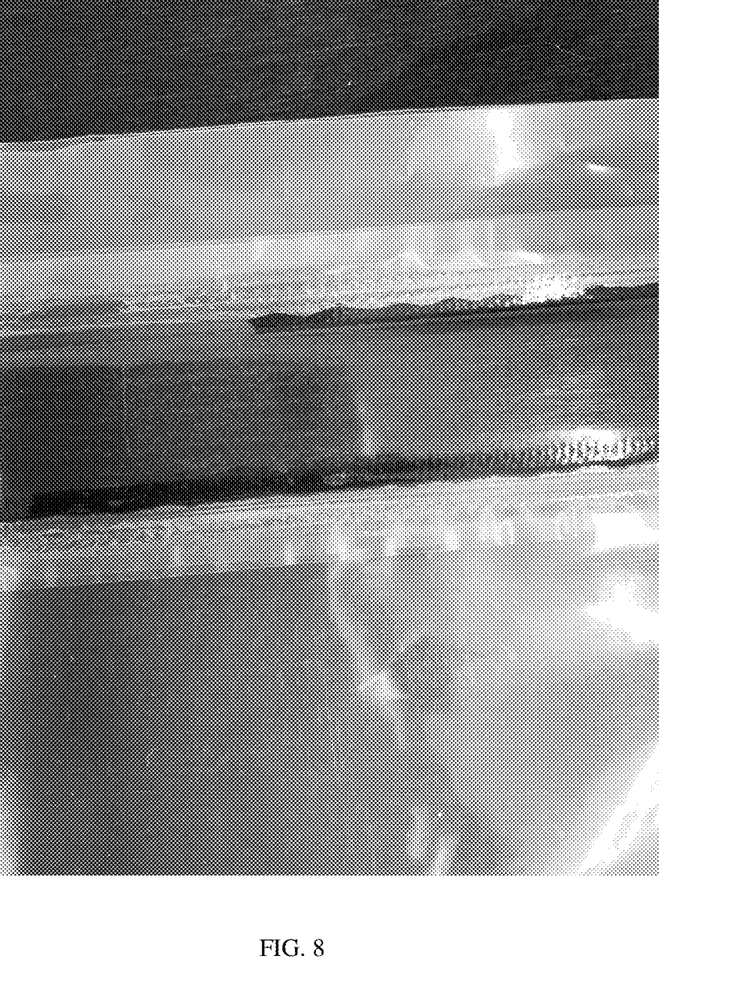
FIG. 8 is a photograph of a front view of a closure feature in a closed configuration, in an embodiment of the invention.
Figure 9:
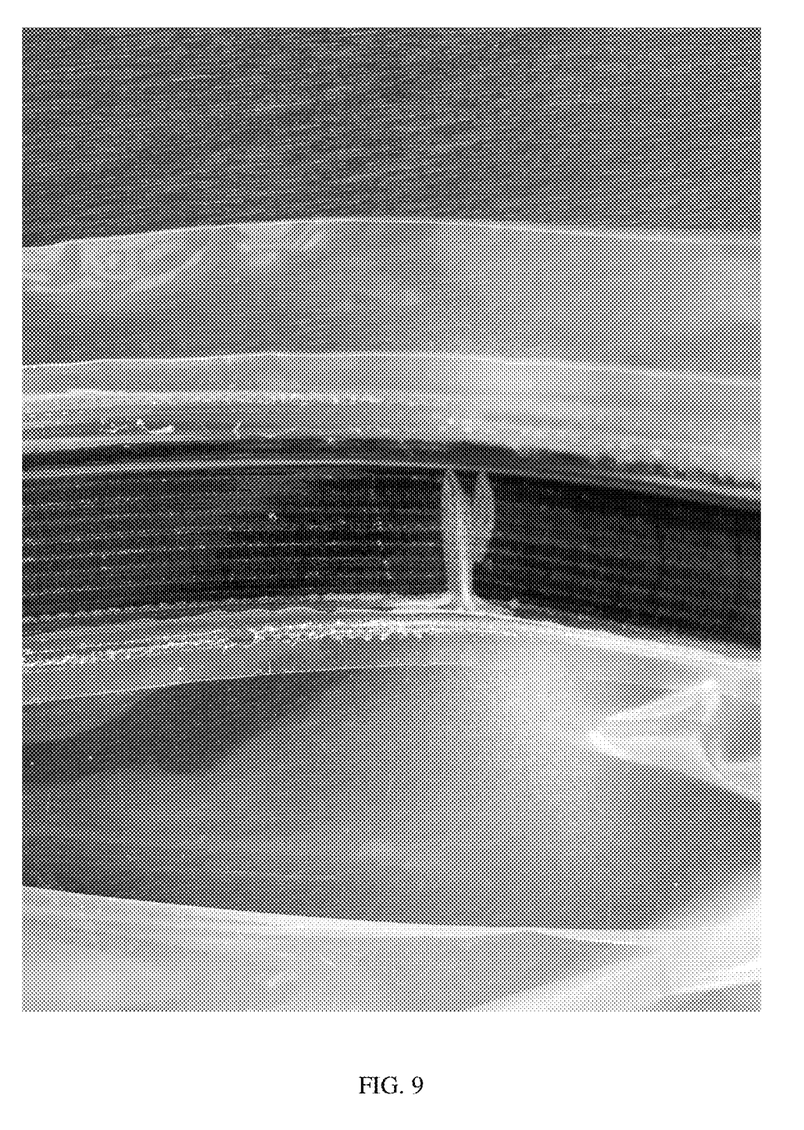
FIG. 9 is a photograph of an interior view of a closure feature in an open configuration, in an embodiment of the invention.

FIG. 5 illustrates an embodiment of the web of pouch material which will form pouches 100 and 100'. The carrier film 51 is disposed atop the magnetic members 54. The web may be cut along lines 62 to define the edges of the pouch. That is, cut line 62 may define the top edge of the pouch on either side of a folded region 64 of the pouch 100. As noted above, the magnetic member 54 may not extend to the top edge 66 of the carrier film 51. In another embodiment, the magnetic member 54 may not extend to the bottom edge 68 of the carrier film 51. In an embodiment, the magnetic member 54 may not extend to the top edge 66 or the bottom edge 68 of the carrier film 51. In this embodiment, the carrier film 51 may be adhered directly to the pouch film interior 55 on either side of the magnetic member 54.

Once the film web has been formed, the package may be side sealed and filled. Alternatively, the closure feature 50 may be first heat sealed, followed by filling of the package through one of the side seals. Regardless of how the package is filled, in an embodiment, the closure feature 50 is heat-sealed. In an embodiment, the closure feature 50 is heat sealed at approximately 300° F. In this embodiment, the selective heat seal initiation temperatures of the various materials may provide a permanent seal between the carrier film 51 and the pouch interior 55 and a peelable seal between the inner layers 52 of the carrier film 51. Thus, one heat seal process may provide both the permanent and peelable heat seal necessary for the invention.

Thought the method is discussed as related to a folded pouch, the method for forming the package having a sealed base portion or a sealed bottom edge will be understood to those of skill in the art. For example, the method may additionally comprise heat-sealing two sheets of film together to form a bottom seal and side seals or heat-sealing two sheets of film to a bottom panel and to each other to form side seals.

In use, a consumer may open the package by peeling the peelable seal of the closure feature 50. The bag may then be reclosed via the magnetic closure feature 50.

Examples

In each example, a 50 gauge sheet of PET with a heatseal initiation temperature of approximately 220° F. was utilized. The PET sheet was adhered and laminated to one of the following for consideration as an outer layer of the carrier film:

Trial 1—1.25 mil sheet of LLDPE
Trial 2—1 mil sheet of LDPE
Trial 3—98 gauge sheet of OPP
Trial 4—PE coextruded film (1.25 mil) with a seal activation temperature of about 180° F. to about 200° F.

The heatseal side of the PET sheet was disposed opposite the respective PE/PP sheet. The laminated potential carrier film was then heat sealed to a magnetic member and a pouch at approximately 300° F. For each trial, the packaging was considered as to stretching, breakage, curling edges, and direct coating ability. Trials 1, 2, and 3 each failed due to issues with one or more of stretching, breakage, curling edges, and/or direct coating ability. Surprisingly, in trial 4, the PE coextruded film was found to be satisfactory in terms of each qualitative characteristic: stretching, breakage, curling edges, and direct coating ability.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A packaging structure comprising:
   a polymeric film folded into a pouch structure such that the pouch comprises a first end, a folded second end opposite the first end, and two sealed side edges, wherein the first end comprises an opening into the pouch and wherein the pouch comprises an interior surface;
   a carrier film disposed adjacent the first end of the pouch, on the interior surface of the pouch, on opposite sides of the opening, wherein the carrier film comprises:
      an inner layer, wherein at least a first portion of the inner layer is peelably heat sealed to a second portion of the inner layer on the opposite side of the opening so as to peelably seal the packaging structure closed; and
      an outer layer adhesively bonded to the inner layer, wherein the outer layer comprises a plastomer and is permanently sealed to the interior surface of the pouch; and
   a magnetic member disposed between the pouch and the outer layer of the carrier film.

2. The packaging structure of claim 1, wherein the carrier film is sealed to the pouch above an upper edge of the magnetic member, below a lower edge of the magnetic member, or both.

3. The packaging structure of claim 1, wherein the carrier film is in the form of a strip.

4. The packaging structure of claim 1, wherein the pouch has a length between the first end and second end and a width between the two side edges and wherein the carrier film extends the width of the pouch.

5. The packaging structure of claim 4, wherein the carrier film does not extend the length of the pouch.

6. The packaging structure of claim 1, wherein the inner layer of the carrier film comprises polyethylene terephthalate.

7. The packaging structure of claim 1, wherein the inner layer of the carrier film comprises heat sealable polyethylene terephthalate.

8. The packaging structure of claim 1, wherein the outer layer of the carrier film comprises a coextruded plastomer.

9. The packaging structure of claim 1, wherein the outer layer of the carrier film comprises a polyolefin plastomer.

10. The packaging structure of claim 1, wherein the outer layer of the carrier film comprises a coextruded polyethylene plastomer.

11. The packaging structure of claim 1, wherein the carrier film is non-extensible.

12. The packaging structure of claim 1, wherein the inner layer of the carrier film has a higher seal initiation temperature than the outer layer.

13. The packaging structure of claim 1, wherein the seal initiation temperature of the inner layer of the carrier film is between about 20 and 40 degrees higher than the seal initiation temperature of the outer layer of the carrier film.

14. The packaging structure of claim 1, wherein the seal initiation temperature of the inner layer of the carrier film is between about 215° and 225° F.

15. The packaging structure of claim 1, wherein the seal initiation temperature of the outer layer of the carrier film is between about 180° and 200° F.

16. A packaging structure comprising:
    a first polymeric film sheet and a second polymeric film sheet sealed together to form a package having a first end, a closed second end opposite the first end, and at least two sealed side edges, wherein the first end comprises an opening into the package and wherein the first polymeric film sheet and the second polymeric film sheet comprise an interior surface;
    a first carrier film strip disposed adjacent the first end of the package, on the interior surface of the first polymeric film sheet, wherein the first carrier film strip comprises:
       an inner layer; and
       an outer layer which comprises a plastomer, wherein the outer layer is permanently sealed to the interior surface of the first polymeric film sheet;
    a second carrier film strip disposed adjacent the first end of the package, on the interior surface of the second polymeric film sheet, wherein the second carrier film strip comprises:
       an inner layer peelably heat sealed to the inner layer of the first carrier film strip so as to peelably seal the packaging structure closed; and
       an outer layer which comprises a plastomer, wherein the outer layer is permanently sealed to the interior surface of the second polymeric film sheet;
    a first magnetic member disposed between the first polymeric film sheet and the outer layer of the first carrier film strip; and
    a second magnetic member disposed between the second polymeric film sheet and the outer layer of the second carrier film strip.

17. The packaging structure of claim 16, wherein the packaging structure additionally comprises a bottom sheet sealed to the first polymeric film sheet and the second polymeric film sheet to form a bottom wall of the package.

18. The packaging structure of claim 16, wherein the first carrier film is sealed to the first polymeric film sheet above an upper edge of the first magnetic member, below a lower edge of the first magnetic member, or both.

19. The packaging structure of claim 16, wherein the second carrier film is sealed to the second polymeric film sheet above an upper edge of the second magnetic member, below a lower edge of the second magnetic member, or both.

20. The packaging structure of claim 16, wherein the inner layer of either the first or second carrier film strip comprises polyethylene terephthalate.

21. The packaging structure of claim 16, wherein the inner layer of either the first or second carrier film strip comprises heat sealable polyethylene terephthalate.

22. The packaging structure of claim 16, wherein the outer layer of either the first or second carrier film strip comprises a coextruded plastomer.

23. The packaging structure of claim 16, wherein the outer layer of either the first or second carrier film strip comprises a polyolefin plastomer.

24. The packaging structure of claim 16, wherein the outer layer of either the first or second carrier film strip comprises a coextruded polyethylene plastomer.

25. A method for forming a packaging structure comprising:
providing a polymeric film web;
providing a carrier film, wherein the carrier film comprises:
an inner layer comprising polyethylene terephthalate; and
an outer layer which comprises a plastomer; and
providing a magnetic member;
layering the magnetic member and the carrier film on the polymeric film web as follows to form a closure member: a first layer of the film web, a first magnetic member, a first carrier film, a second carrier film, a second magnetic member, and a second film web, wherein the carrier film is disposed such that the outer plastomer layer is adjacent the magnetic member and wherein the carrier film extends beyond at least one of an upper edge and a lower edge of the magnetic member; and
heat sealing the closure member at a temperature that is higher than the seal initiation temperature of the polyethylene terephthalate layer such that the seal at the interface of the first carrier film and the second carrier film is a peelable seal, the seal at the interface of the first film web and the first carrier film is a permanent seal, and the seal at the interface of the second film web and the second carrier film is a permanent seal.

26. The method of claim 25, wherein the peelable seal and the permanent seal are formed in a single heat sealing step.

27. The method of claim 25, wherein the inner layer of the carrier film comprises heat sealable polyethylene terephthalate.

28. The method of claim 25, wherein the outer layer of the carrier film comprises a coextruded plastomer.

29. The method of claim 25, wherein the outer layer of the carrier film comprises a polyolefin plastomer.

30. The method of claim 25, wherein the outer layer of the carrier film comprises a coextruded polyethylene plastomer.

31. The method of claim 25, wherein the carrier film is non-extensible.

32. The method of claim 25, wherein the inner layer of the carrier film has a higher seal initiation temperature than the outer layer.

33. The method of claim 25, wherein the seal initiation temperature of the inner layer of the carrier film is between about 20 and 40 degrees higher than the seal initiation temperature of the outer layer of the carrier film.

34. The method of claim 25, wherein the seal initiation temperature of the inner layer of the carrier film is between about 215° and 225° F., the seal initiation temperature of the outer layer of the carrier film is between about 180° and 200° F., and the heat sealing step is conducted at approximately 300° F.

35. A carrier film for a magnetic closure comprising:
a first non-extensible inner layer;
a second non-extensible inner layer, wherein an inner surface of the first inner layer is configured to form a peelable heat seal with an inner surface of the second inner layer;
a first outer layer having an inner surface adhesively bonded to an outer surface of the first inner layer, wherein the first outer layer comprises a plastomer and wherein the outer surface of the first outer layer is configured to form a permanent heat seal with a first wall of a packaging structure;
a second outer layer having an inner surface adhesively bonded to an outer surface of the second inner layer, wherein the second outer layer comprises a plastomer and wherein the outer surface of the second outer layer is configured to form a permanent heat seal with a second wall of the packaging structure;
a first magnetic member disposed adjacent the outer surface of the first outer layer and configured to be sealed between the first wall of the packaging structure and the first outer layer; and
a second magnetic member disposed adjacent the outer surface of the second outer layer and configured to be sealed between the second wall of the packaging structure and the second outer layer.

36. The carrier film of claim 35, wherein either the first or the second inner layer of the carrier film comprises polyethylene terephthalate.

37. The carrier film of claim 35, wherein either the first or the second outer layer of the carrier film comprises a coextruded polyethylene plastomer.

* * * * *